Dec. 30, 1930.  P. C. YATES  1,786,472
AIRFOIL
Filed Nov. 2, 1928

Paul C. Yates, Inventor
By Jesse R. Stone, Attorney

Patented Dec. 30, 1930

1,786,472

UNITED STATES PATENT OFFICE

PAUL C. YATES, OF HOUSTON, TEXAS, ASSIGNOR OF ONE-FOURTH TO WALTER F. WOODUL, OF HOUSTON, TEXAS

AIRFOIL

Application filed November 2, 1928. Serial No. 316,726.

My invention relates to airfoils for use on aircraft as a means of obtaining a lifting force whereby the craft may be supported.

There have been in the past many and varied theories as to the origin and location of the lifting forces which sustain an airplane. Some of these theories have been disproved, others have been accepted, and still others are in doubt; however it is now generally accepted that the greatest lifting forces are derived from the partial vacuum obtained adjacent the leading edge and above the wing or airfoil.

It is the object of my invention to so construct the outer contour of an airfoil that the greatest amount of lifting power will be obtained by utilizing the full effect of the air currents.

It is another object of my invention to distribute the area of application of the lifting force on the upper surface of the airfoil.

Another object is to obtain an airfoil which will give a maximum of stability due to the distribution of the lifting forces and at the same time will result in the elimination of eddy currents and drag at the trailing edge.

Still another object is to provide an airfoil having a convex upper surface at its leading edge and another convex upper surface adjacent the trailing edge and having the trailing edge disposed in a horizontal plane substantially the same as the leading edge.

Figure 2:
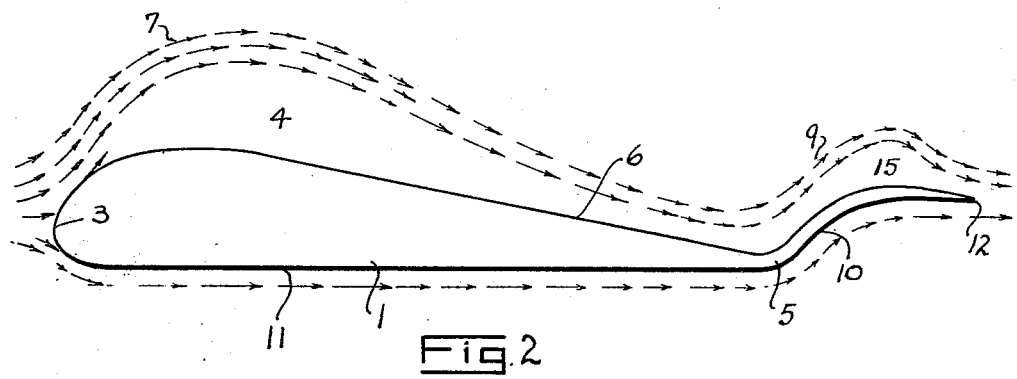
Figure 1:
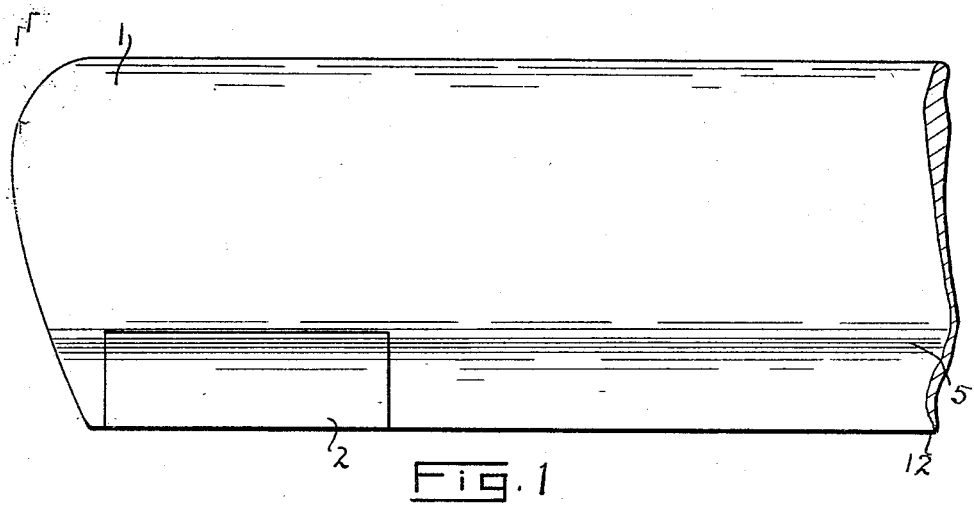

Other and further objects of my invention will be readily apparent to those skilled in the art to which my invention appertains when the following description is taken in connection with the accompanying drawing wherein:

Fig. 1 is a top plan view of an airplane wing constructed to embody my improvement and, Fig. 2 is a view of an airfoil section showing diagrammatically the outer contour of the wing of Fig. 1.

The airfoil as shown in Fig. 1 may be such as used upon any type of aircraft and is designated by the numeral 1; at 2 is indicated an aileron or stabilizer for use in guiding the plane or obtaining additional stability. This is shown as being of standard construction and may be applied to my improved wing as well as to the usual type now in use. Fig. 2 best illustrates the contour of my construction. The wing shown being only diagrammatic as it is intended that the structure may have either internal or external bracing and it may be either a thick wing or a thin wing as desired. The numeral 3 indicates the leading edge of the wing which is formed to obtain the maximum deviation of the air current 7 represented by the arrows to show the path of travel. The rising air stream or wave creates a semi-vacuum at the area 4 which accordingly exerts an upward pull or lift upon the wing. The area 4 will vary in size with the speed of the plane and the load being carried, but will ordinarily be located back about one third of the width of the wing from the leading edge.

The upper surface of the wing may be either straight or slightly curved from the leading edge to the point 5 as desired, the majority of the wings having a substantially straight upper surface between the leading and trailing edges.

With the usual wing structure which is similar to the illustration of Fig. 2 back to the point 5, the full effect of the air stream is not utilized, and, as indicated by the arrows, returns from its initial deviation to strike the wing surface adjacent the point 6 and be again deflected somewhat as a ripple or reaction of the initial wave 7. Thus the air stream above the wing has started on an upward path at the time the trailing edge at 5 in the normal wing has been reached, whereas the air stream below the wing is traveling parallel to the surface 11 so that the two streams are not approaching each other at a small angle but are actually diverging at the time when they pass the usual trailing edge 5. An eddying is caused by these diverging streams which tends to act as a drag upon the wing. The usual wing just described has but a single area 4 upon which an uplift is exerted so that it is equivalent of trying to balance a load upon a single point of support. The result being that slow flying or variation of the wing from its path of travel upsets the currents of air and the vacuum 4 is destroyed momentarily. It is this momentary loss of the lifting effect which is now believed to be responsible for the many crashes, and devices such as wing slots and other attachments have been resorted to in an attempt to immediately restore the single lift area of support.

It is the aim of my construction to provide a wing which will have two areas of support instead of the single area 4. It is believed that the advantage of such an arrangement will be readily apparent. To obtain the second point of support I have constructed an airfoil having a trailing edge which is curved convexly upward at 10 and terminates in a somewhat thin portion 12. With this arrangement the air stream after striking the upper surface 6 is given an additional upward impetus as at 9 by the surface 10, creating the lifting area 15. This area is not as large as the area 4 but is sufficient to act as a guiding means, and inasmuch as it is spaced from the area 4 a considerable distance its leverage is very effective so that it serves to add not only lifting area but a stability not hitherto obtainable.

The air stream on the lower side of the airfoil travels as indicated by the arrows and near the trailing edge the wing section curves concavely upward as at 10, which breaks up the suction on the wing and at 12 the stream is deflected in a path substantially parallel with the upper air stream 9. The eddying and drag on the trailing edge is further eliminated due to the fact that the vacuum area 15 has not entirely disappeared at the trailing edge 12, a slight suction is therefore evident which prevents eddying and draws the two air streams gradually together. By providing this additional convexo-cancavo portion at the trailing edge I am able to apply a lifting effect to the airfoil along an area where heretofore there has been found to be an objectionable eddying and drag upon the wing, tending to cause lack of stability.

It will be noted that the second lifting surface is disposed in a horizontal plane substantially the same as that of the leading edge and is so spaced that it receives the air stream 7 just as it is deflected upwardly the second time.

The area of the airfoil here described will be somewhat greater than an airfoil of the same contour area which has not the elevated trailing edge, but at the same time the increased lifting surface and the added stability will permit the reduction in the span of the wing, and shortening of the fuselage, both of which more than compensate for the increased thrust required.

An aileron 2 may be a continuation of the wing in the same plane as the body 6 or it may be of the same contour as the structure of Fig. 2 and is preferably so, so that the additional lifting area is continuous entirely across the plane.

An airplane equipped with my improved wing surfaces will have almost automatic lateral stability due to the two point suspension which greatly increases the gliding ratio and permits a low minimum flying speed. These advantages in turn permit a safe descent in small areas and ease of control by pilot. Other and obvious advantages will be readily apparent to those skilled in aeronautics.

It is to be understood that the aileron is controlled by proper devices as is usual in the art. My improved airfoil may be made in various sizes and configuration without departing from the spirit of my invention as set forth in the appended claims.

Having described my invention what I desire to secure by Letters Patent is:

1. A thick airplane airfoil having a plurality of vacuum creating surfaces one of said surfaces including the leading edge of said airfoil and the thick portion of the wing, the other of said surfaces comprising a thin winged portion formed integral with said thick portion and adjacent the trailing edge thereof.

2. An airplane airfoil of the thick type having a plurality of convex air stream deviating surfaces, one of said surfaces including the thick portion and the leading edge of said airfoil and another of said surfaces being adjacent the trailing edge thereof and comprising a thin portion lying in substantially the same horizontal plane as the first said surface.

3. In a device of the character described, an upper surface including a convexly curved deflecting portion, a substantially straight portion, and a second convexly curved portion, an under surface comprising a smooth flat portion and an upwardly curved concave portion, said second convex portion and said concave portion joining to form a trailing edge.

In testimony whereof I hereunto affix my signature this 29 day of October, A. D. 1928.

PAUL C. YATES.